(12) United States Patent
Jao et al.

(10) Patent No.: US 8,059,155 B2
(45) Date of Patent: Nov. 15, 2011

(54) SYSTEM AND METHOD FOR MEASURING FIELD OF VIEW OF DIGITAL CAMERA MODULES

(75) Inventors: Ching-Lung Jao, Miao-Li Hsien (TW); Kuo-Liang Tai, Miao-Li Hsien (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 1331 days.

(21) Appl. No.: 11/626,723

(22) Filed: Jan. 24, 2007

(65) Prior Publication Data

US 2008/0129833 A1 Jun. 5, 2008

(30) Foreign Application Priority Data

Dec. 1, 2006 (CN) .......................... 2006 1 0157204

(51) Int. Cl.
*H04N 17/00* (2006.01)

(52) U.S. Cl. ......... 348/188; 702/116; 348/180; 348/187

(58) Field of Classification Search ............... 348/222.1, 348/E5.31, 188, 187, 180
See application file for complete search history.

(56) References Cited

U.S. PATENT DOCUMENTS

| 5,959,726 A * | 9/1999 | Riley et al. ................. 356/124.5 |
| 2003/0156194 A1* | 8/2003 | Sugiura et al. ................ 348/187 |

* cited by examiner

*Primary Examiner* — Jefferey Harold
*Assistant Examiner* — Omer Khalid
(74) *Attorney, Agent, or Firm* — Altis Law Group, Inc.

(57) ABSTRACT

A measuring system (200) for measuring a FOV of a digital camera module (52) includes a measuring chart (22), a parameter inputting module (32), and a processing module (42). The measuring chart defines a colored portion. The parameter inputting module is used to input relative parameters. The processing module is connected to the parameter inputting module and receives electronic image signals converted from images of the colored portion and of the measuring chart screened by the lens module. The processing module is configured for calculating the FOV θ of the digital camera module. A measuring method for measuring the FOV θ of the digital camera module is also provided.

2 Claims, 6 Drawing Sheets

SYSTEM AND METHOD FOR MEASURING FIELD OF VIEW OF DIGITAL CAMERA MODULES

BACKGROUND OF THE INVENTION

1. Field of the Invention

The present invention relates generally to a measuring system for measuring a field of view (FOV) of digital camera modules and, more particularly, to a FOV measuring system that simplifies measuring procedures.

2. Description of Related Art

Digital cameras are now in widespread use with the ongoing development of micro-circuitry and multimedia technologies. High-end portable electronic devices, such as mobile phones and personal digital assistants (PDAs), are being developed to be increasingly multi-functional. Many of these portable electronic devices are now equipped with digital camera modules.

In a digital camera module, a FOV is a very important factor in determining the quality of the pictures captured by the digital camera module. Therefore, the FOV of the digital camera module requires measuring before the digital camera module is deemed acceptable for use.

Referring to FIG. 1 and FIG. 2, a digital camera module 50 includes a lens module 501 and an image sensing module 503. When the FOV θ of the digital camera module is measured, the digital camera module 50 is used to image a measuring chart 20. The lens module 501 captures an image area 201 of the chart 20 and forms an object image 201' on the image sensing module 503. The FOV θ can be described by either equation 1 or equation 2 below:

$$\theta = 2 \times \arctan(d/2s) \quad \text{(Equation 1)}$$

$$\theta = 2 \times \arctan(d'/2f) \quad \text{(Equation 2)}$$

Wherein d is a length of a diagonal line AC of the image area 201, d' is a length of a diagonal line A'C' of the image area 201', s is a distance between the lens module 501 and the measuring chart, and f is a focal length of the lens module 501. The image sensing module 503 is placed in an image plane of the lens module 501, and, therefore, a distance between the image sensing module 503 and the lens module 501 is equal to the focal length f of the lens module 501.

In this way, if d and s are measured, the FOV θ can be calculated using equation 1; if d' and f' are measured, the FOV θ can be calculated using equation 2.

Referring to FIG. 3, a typical FOV measuring system 100 is used to measure a FOV of a digital camera module 50. The typical measuring system 100 includes a measuring chart 20, a parameter inputting module 30, and a processing module 40. The digital camera module 50 includes a lens module 501 and an image sensing module 503. The lens module 501 captures an image area 201 of the chart 20 and forms an object image 201' on the image sensing module 503. The image sensing module 503 converts optical signals of the object image 201' into electrical signals and transmits the electrical signals to the processing module 40. The parameter inputting module 30 inputs a pixel length $L_d$ of each pixel of the image sensing module 503 and a distance f between the lens module 501 and the image sensing module 503 into the processing module 40. At the same time, the processing module 40 calculates the number of pixels $P_d$ of a diagonal A'C' of the image area 201' by means of automatically searching a frame of the measuring chart 20. In this way, the FOV θ can be calculated by means of the equation 2:

$$\theta = 2 \times \arctan(d'/2f) = 2 \times \arctan(P_d \times L_d / 2f)$$

However, much time is needed in searching a boundary of the image area 201, and the processing module 40 is prone to make mistakes in such an automatic search. Additionally, when the typical measuring system 100 is used to measure different types of digital camera modules 50 with different pixel lengths $L_d$, the pixel length $L_d$ of each type of digital camera module 50 requires measuring and inputting into the processing module 40. This work costs more time and manpower.

Therefore, a new system for measuring FOV of camera modules and a new measuring method are desired in order to overcome the above-described shortcomings.

SUMMARY OF THE INVENTION

In one aspect, a measuring system for measuring a FOV of a digital camera module includes a measuring chart, a parameter inputting module, and a processing module. The measuring chart defines a colored portion. The parameter inputting module is used to input relative parameters. The processing module is connected to the parameter inputting module and receives electronic image signals converted from images of the colored portion and the measuring chart screened by the lens module for calculating the FOV θ (i.e., FOV angle θ, where θ is theta) of the digital camera module.

In another aspect, a measuring method for measuring a FOV of a digital camera module including a lens module incorporates these steps: providing a measuring system, the measuring system including a measuring chart defining a colored portion and a processing module; the processing module receiving electronic image signals converted from images of the colored portion and the measuring chart screened by the lens module, the electronic image signals and the measuring chart being used for calculating the FOV θ of the digital camera module; measuring the length a of the side of the colored portion and a distance s between the measuring chart and the lens module; inputting the length a and the distance s into the processing module; screening the measuring chart to form an image of the colored portion contained in an image of the measuring chart; measuring the number of pixels $P_a$ of a side the image of the colored portion and the number of pixels $P_d$ of a diagonal of the image of the measuring chart; and calculating the FOV θ of the digital camera module.

Other advantages and novel features will become more apparent from the following detailed description, when taken in conjunction with the accompanying drawings.

BRIEF DESCRIPTION OF THE DRAWINGS

Many aspects of the present FOV measuring system and method can be better understood with reference to the following drawings. The components shown in the various views of the drawings are not necessarily drawn to scale, the emphasis instead being placed upon clearly illustrating the principles of the present FOV measuring system and method. Moreover, in the drawings, like reference numerals designate corresponding parts throughout several of the views.

DETAILED DESCRIPTION OF THE INVENTION

Figure 1:
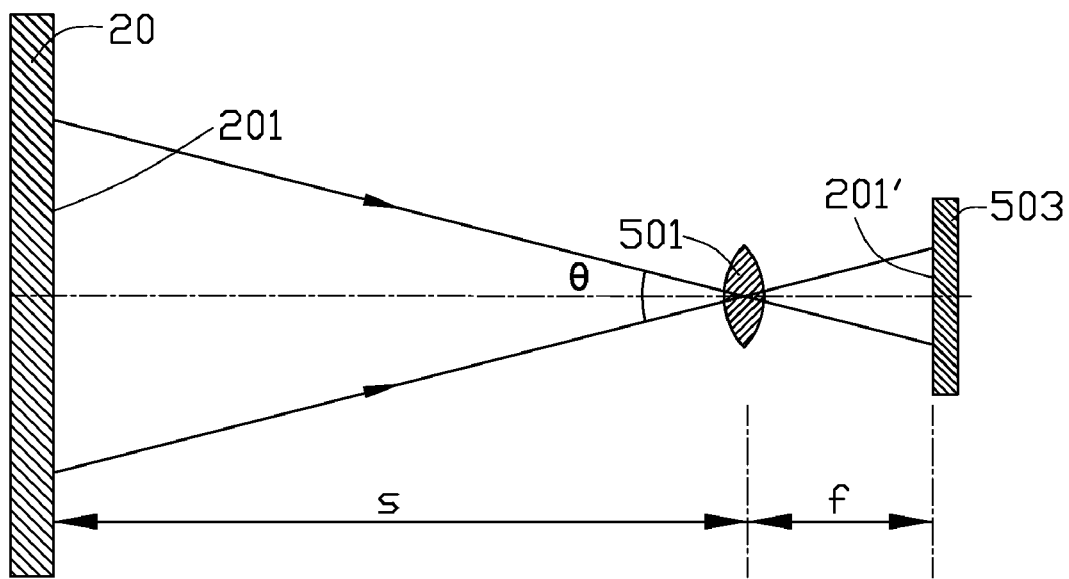
FIG. 1 is a schematic view of a known theory for measuring a FOV of a digital camera module.
Figure 2:
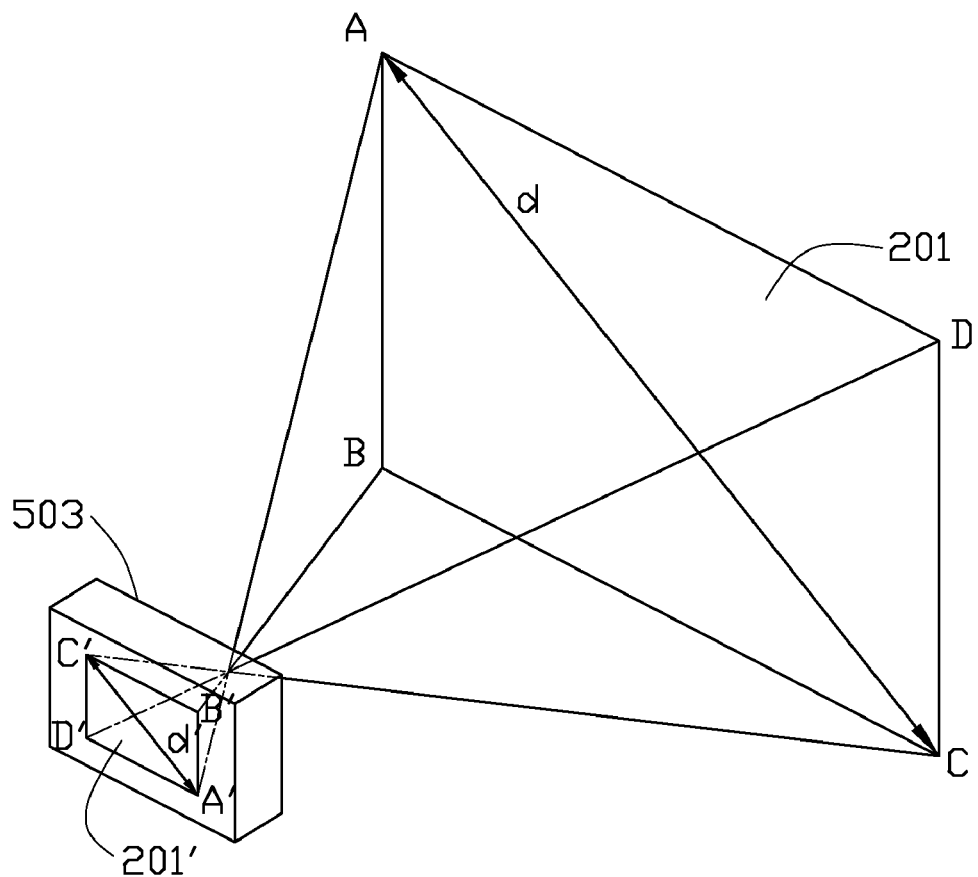
FIG. 2 is a schematic view of a FOV of an image sensing module shown in FIG. 1.
Figure 3:
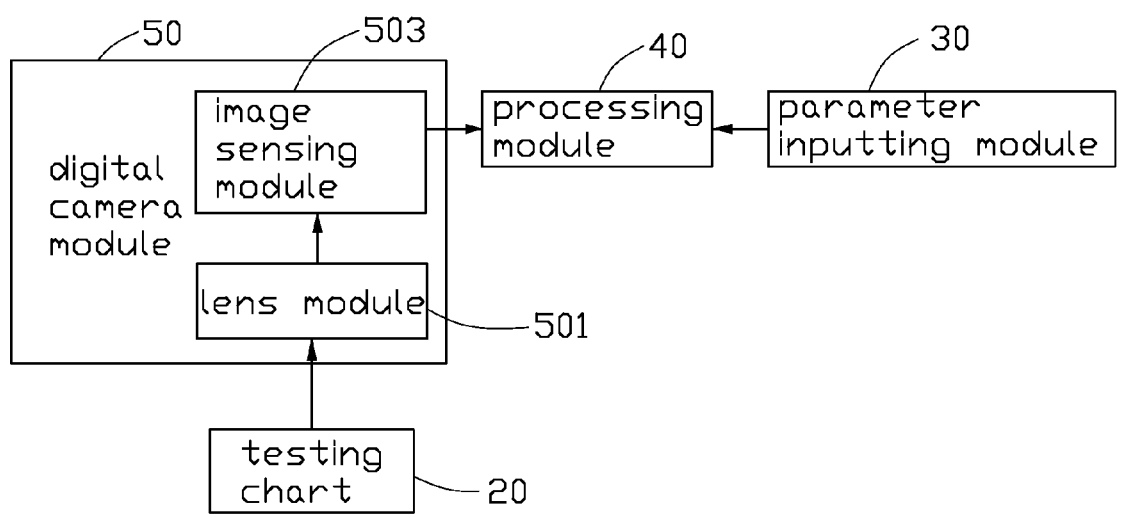
FIG. 3 is a diagram of a typical FOV measuring system.
Figure 4:
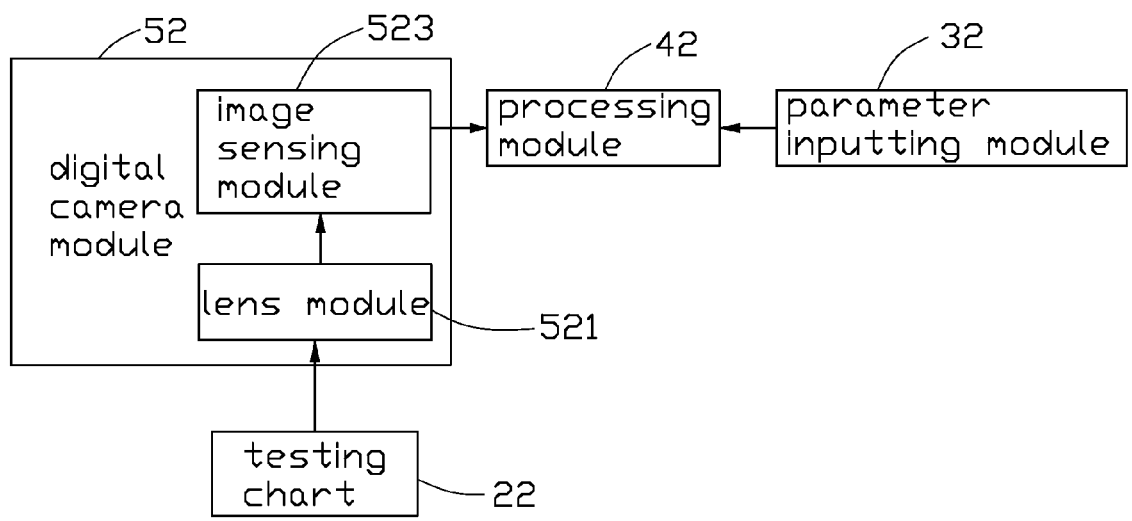
FIG. 4 is a diagram of a FOV measuring system, in accordance with a preferred embodiment of the present FOV measuring system and method.

Referring now to the drawings in detail, FIG. 4 shows a FOV measuring system 200, in accordance with a preferred embodiment of the present FOV measuring system and method. The measuring system 200 is used to measure a FOV θ of a digital camera module 52. The measuring system 200 includes a measuring chart 22, a parameter inputting module 32, and a processing module 42. The processing module 42 is electrically connected to the parameter inputting module 32.

The digital camera module 52 includes a lens module 521 and an image sensing module 523. The lens module 521 is used to form a focused image on the image sensing module 523. The image sensing module 523 is electronically connected to the processing module 42 to transfer electric image signals thereto.

Figure 5:
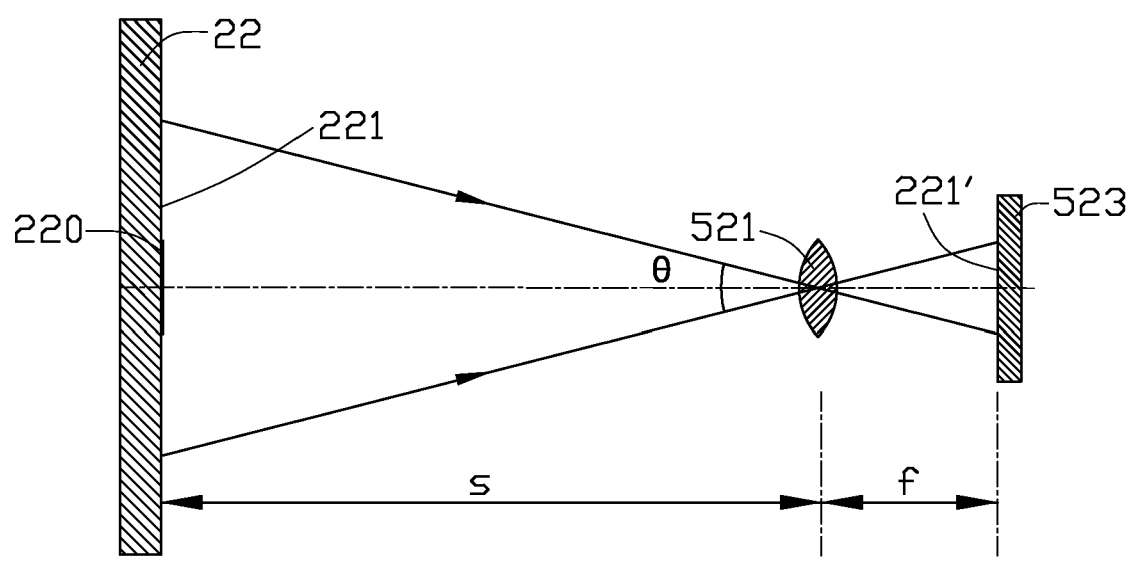
FIG. 5 is a schematic view of a theory for using the present FOV measuring system, shown in FIG. 4, to measure a FOV of a digital camera module.
Figure 6:
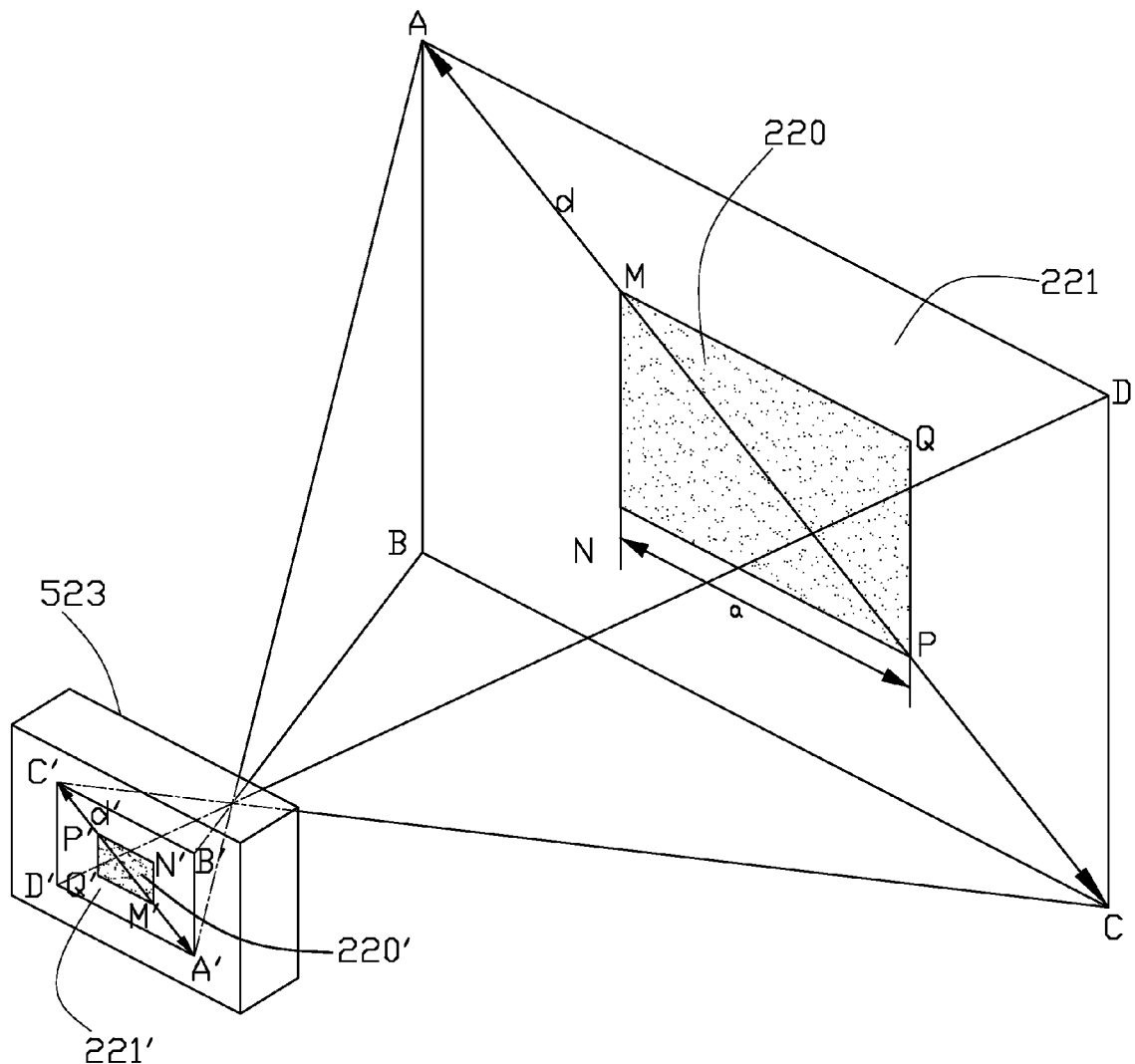
FIG. 6 is a schematic view of a FOV of an image sensing module, as shown in FIG. 4 and FIG. 5.

Further now referring to FIG. 5 and FIG. 6, a colored portion 220 (wherein the term "color" is broadly meant to include any of RGB-based colors; black; and shades of gray) is defined in an approximately central portion of the measuring chart 22. The colored portion 220 is rectangular and includes four vertexes M, N, P and Q. A length a of a side NP of the colored portion 220 can be measured using measuring tools, such as verniers or calipers. The colored portion 220, in the illustrated example, is black. Understandably, the colored portion 220 can be of other regular shapes with straight sides, such as triangle or a trapezium. The colored portion 220 also can have other colors, so long as the colored portion 220 can readily be visibly distinguished from other portions of the measuring chart 22.

The parameter inputting module 32 is used/configured to input relative parameters into the processing module 42, such as the lengths of sides of the colored portion 220 and/or the d distance between the lens module 521 and the measuring chart 22. The processing module 40 is electronically connected with the parameter inputting module 32 and the digital camera module 52 and is further configured to process measuring data and image signals and to thereby calculate measuring results.

The measuring process performed by the FOV measuring system 200 is, furthermore, demonstrated in FIG. 5 and FIG. 6. When measuring the FOV θ of the digital camera module 52, the colored portion 220 should be contained in a screening range 221 of the lens module 521. Referring to FIG. 5, the screening range 221 is approximately a rectangle and includes four vertexes A, B, C and D. The colored portion 220 is contained in the screening range 221. The lens module 521 captures a portion in the screening range 221 of the chart 22 and forms an object image 221' on the image sensing module 523. The lens module 521 also captures the colored portion 220 and forms an image 220' that includes four vertexes M', N', P' and Q' and is contained in the image 221' on the image sensing module 523.

The image 221' and the image 220' are received by the image sensing module 523 and are converted into electronic image signals. The electronic image signals are transmitted to the processing module 42. The processing module 42 automatically measures the number of pixels $P_a$ of a side N'P' of the image 220' and the number of pixels $P_d$ of a diagonal A'C' of the image 221'. Since the length a of the side NP of the colored portion 220 can be manually or, potentially, electronically measured, the length d of the diagonal AC can be calculated according to this equation:

$$d = \frac{a}{P_a} \times P_d \qquad \text{(Equation 3)}$$

In this way, when a distance s between the measuring chart 22 and the lens module 521 is measured, the FOV θ of the digital camera module 52 can be calculated according to this equation:

$$\theta = 2 \times \tan^{-1}(d/2s) = 2 \times \tan^{-1}(a \times P_d / 2 \times P_a \times s) \qquad \text{(Equation 4)}$$

According to aforementioned process, a measuring method in accordance with the preferred embodiment, using the measuring system 200 to measure the FOV θ of the digital camera module 52, includes these following steps:

providing a measuring system 200;

measuring the length a of the side NP of the colored portion 220 and the distance s between the measuring chart 22 and the lens module 521;

inputting the length a and the distance s into the processing module 42 via the parameter inputting module 32 and storing the length a and the distance s in the processing module 42;

using the lens module 521 of the digital camera module 52 to screen the measuring chart 22, the colored portion 220 being contained in the screening range 221 of the lens module 521;

using the lens module 521 to captures the screening range 221 and the colored portion 220 and to then form an image 221' and an image 220' that includes four vertexes M', N', P' and Q' and that is contained in the image 221' on the image sensing module 523;

converting the image 221', via the image sensing module 523, into electronic image signals and transferring the electronic image signals to the processing module 42;

employing the processing module 42 to automatically measure the number of pixels $P_a$ of a side N'P' of the image 220' and the number of pixels $P_d$ of a diagonal A'C' of the image 221'; and using the processing module 42 to calculate the FOV θ of the digital camera module 52 according to this equation:

$$\theta = 2 \times \arctan(a \times P_d / 2 \times P_a \times s)$$

Understandably, the length a of a side of the colored portion 220 and the distance between the measuring chart 22 and the lens module 521 can be stored in the processing module 42. When the measuring system 200 is used to measure many digital camera modules 52, if the measuring chart 22 and the distance s are not changed, the processing module 42 can use the saved length a and distance s when measuring all digital camera modules 52. In this way, the step of inputting the length a and the distance s, before measuring the respective number of pixels $P_a$ of a side N'P' of the image 220' and the respective number of pixels $P_d$ of a diagonal A'C' of the image 221' of each digital camera module 52, can be omitted.

Additionally, in the aforementioned method, the pixel length $L_d$ of the digital camera module 52 is not required. Therefore, the measuring system 200 can be easily used to ultimate measure the FOV θ of different types of digital camera modules 52, without providing the pixel length $L_d$ of each type of digital camera module 52, unlike the measuring process of the prior art. Thus, the measuring system 200 reduces the potential for mistakes during measuring. In this way measuring time is saved, and measuring quality is improved.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A measuring system for measuring a field of view (FOV) of a digital camera module, the measuring system comprising:
   a measuring chart defining a colored portion, the colored portion comprising a straight side;
   a parameter inputting module for inputting relative parameters comprising the distance between the measuring chart and a lens module of the digital camera module, and the length of the straight side; and
   a processing module connected to the parameter inputting module for receiving the relative parameters and connected to the digital camera module for receiving electronic image signals converted from images of the colored portion and the measuring chart screened by the lens module, the processing module being configured for measuring the number of pixels of a side of the image of the colored portion corresponding the straight side and the number of pixels of a diagonal of the image of the measuring chart screened by the lens module, and calculating the FOV according to the distance, the length, and the measured numbers, wherein the FOV is calculated according to this formula:

$$\theta = 2 \times \arctan(a \times P_d / 2 \times P_a \times s),$$

wherein $\theta$ is the FOV, $a$ is the length, $P_d$ is the number of the pixels of the diagonal of the image of the measuring chart screened by the lens module, $P_a$ is the number of the pixels of the side of the image of the colored portion corresponding the straight side, and $s$ is the distance.

2. A measuring method for measuring an FOV of a digital camera module including a lens module, the measuring method comprising these steps:
   providing a measuring system, the measuring system including a processing module and a measuring chart defining a colored portion that comprises a straight side, the processing module receiving electronic image signals converted from images of the colored portion and the measuring chart screened by the lens module, the processing module being configured for calculating the FOV;
   measuring the length of the straight side and the distance between the measuring chart and the lens module; and
   inputting the length and the distance into the processing module;
   measuring the number of pixels of a side the image of the colored portion corresponding to the straight side and the number of pixels of a diagonal of the image of the measuring chart screened by the lens module; and
   calculating the FOV based upon the length, the distance, and the measured numbers, wherein the FOV is calculated according to this formula:

$$\theta = 2 \times \arctan(a \times P_d / 2 \times P_a \times s),$$

wherein $\theta$ is the FOV, $a$ is the length, $P_d$ is the number of the pixels of the diagonal of the image of the measuring chart screened by the lens module, $P_a$ is the number of the pixels of the side of the image of the colored portion corresponding the straight side, and $s$ is the distance.

* * * * *